United States Patent Office 3,204,266
Patented Sept. 7, 1965

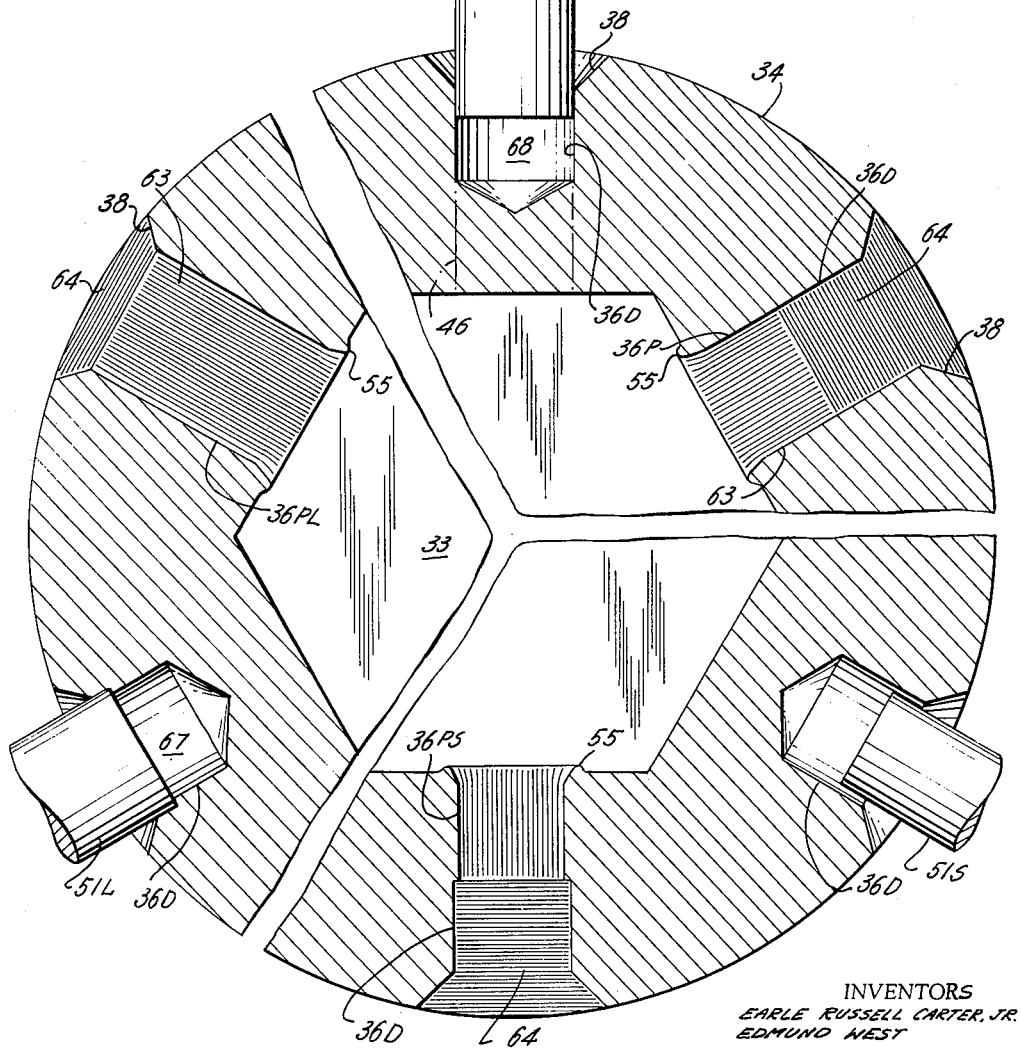

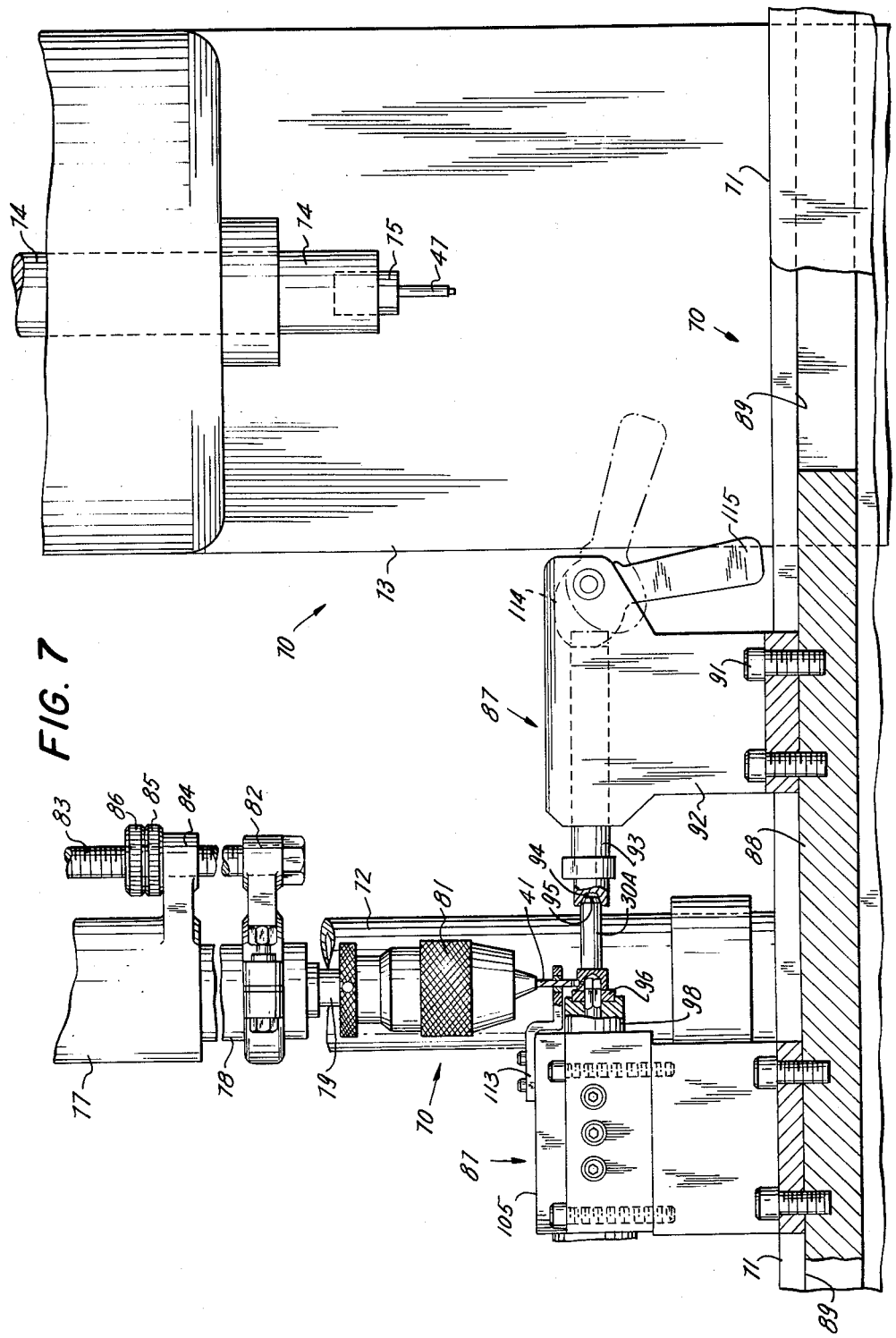

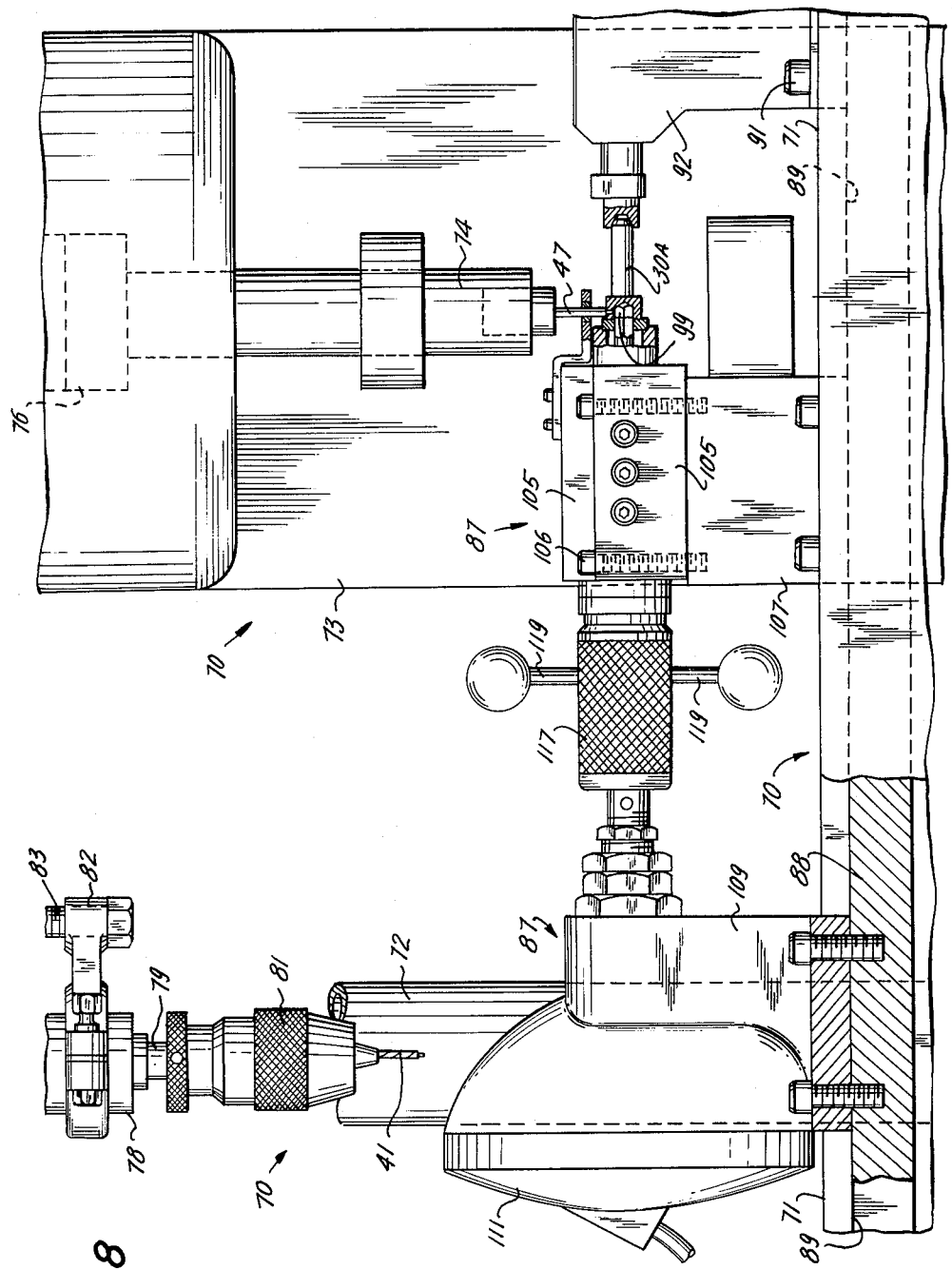

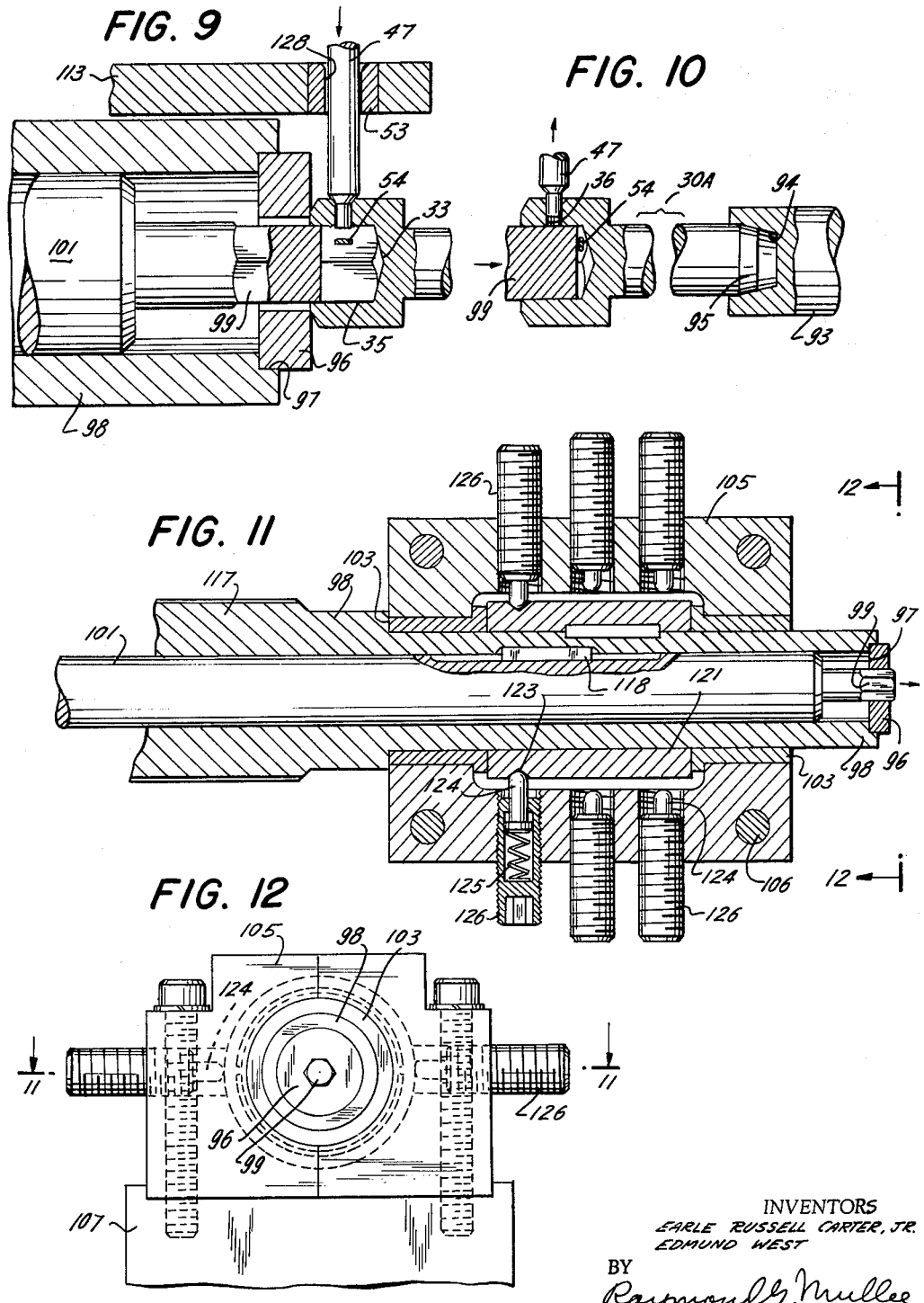

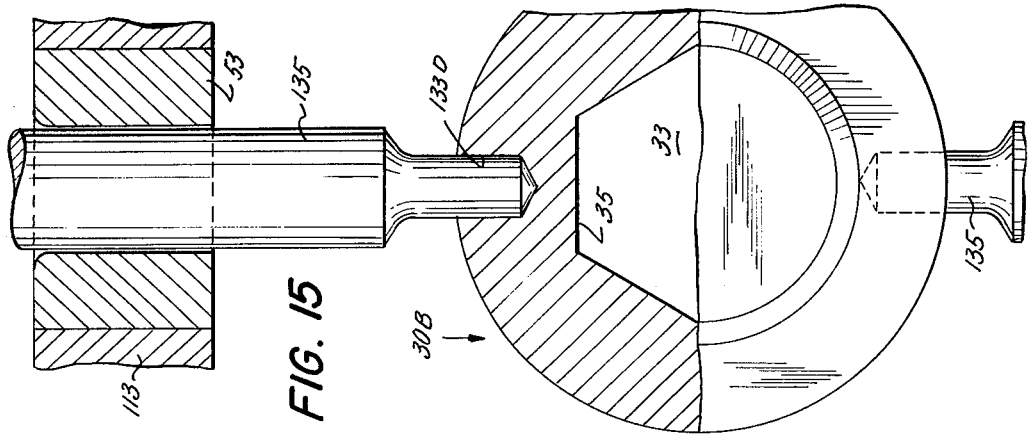
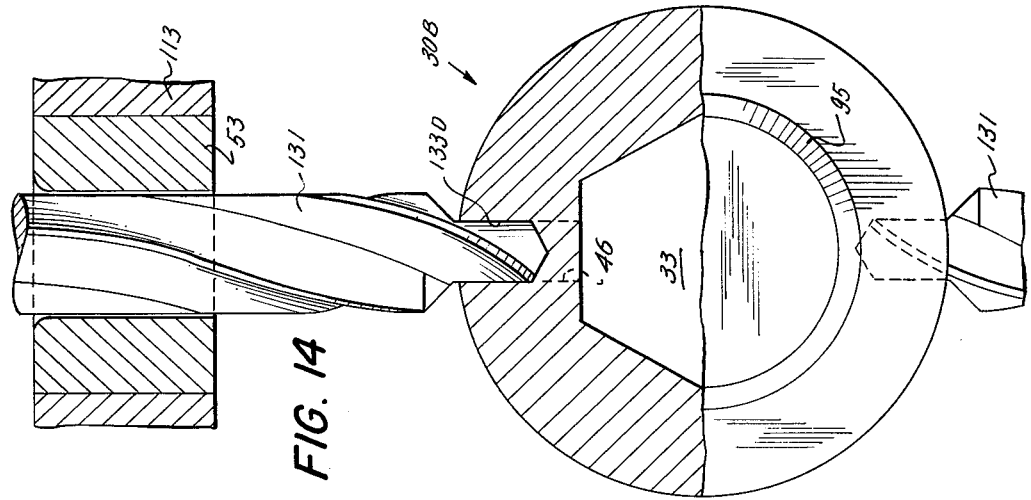
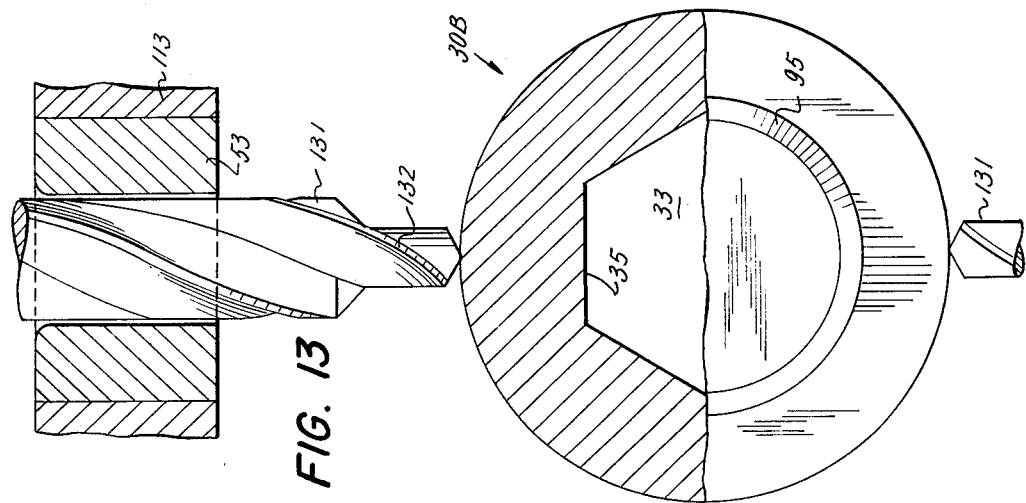

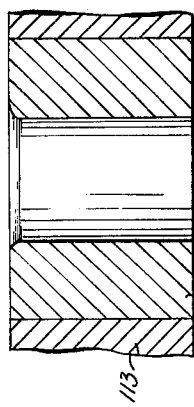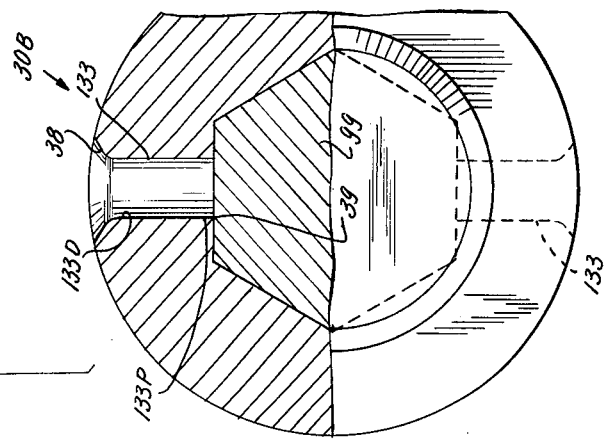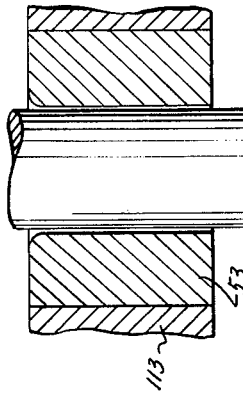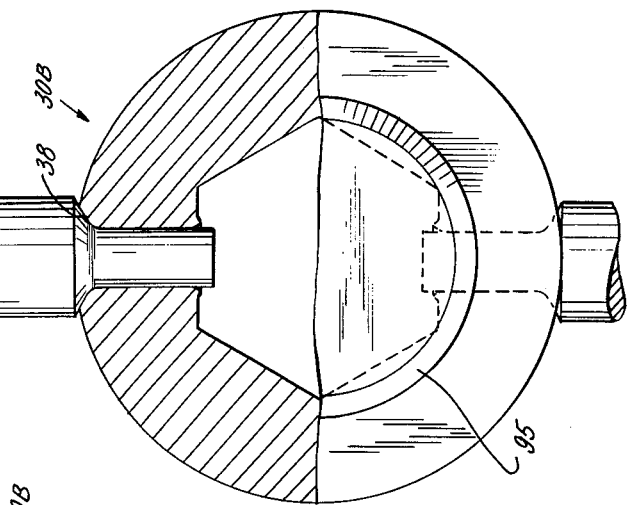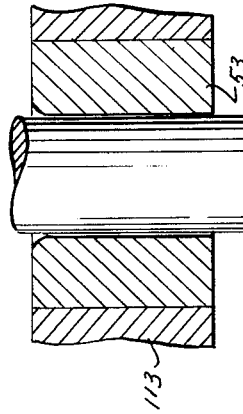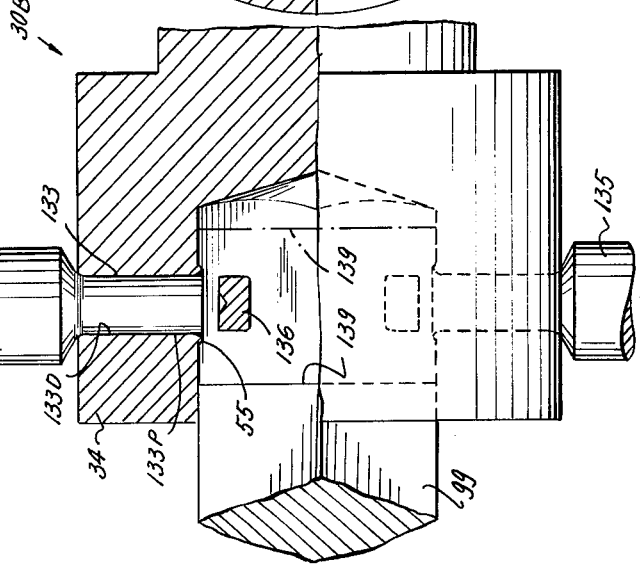

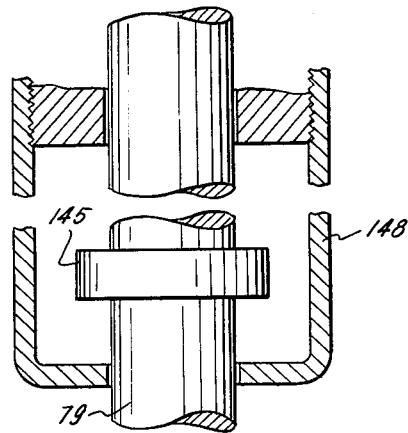
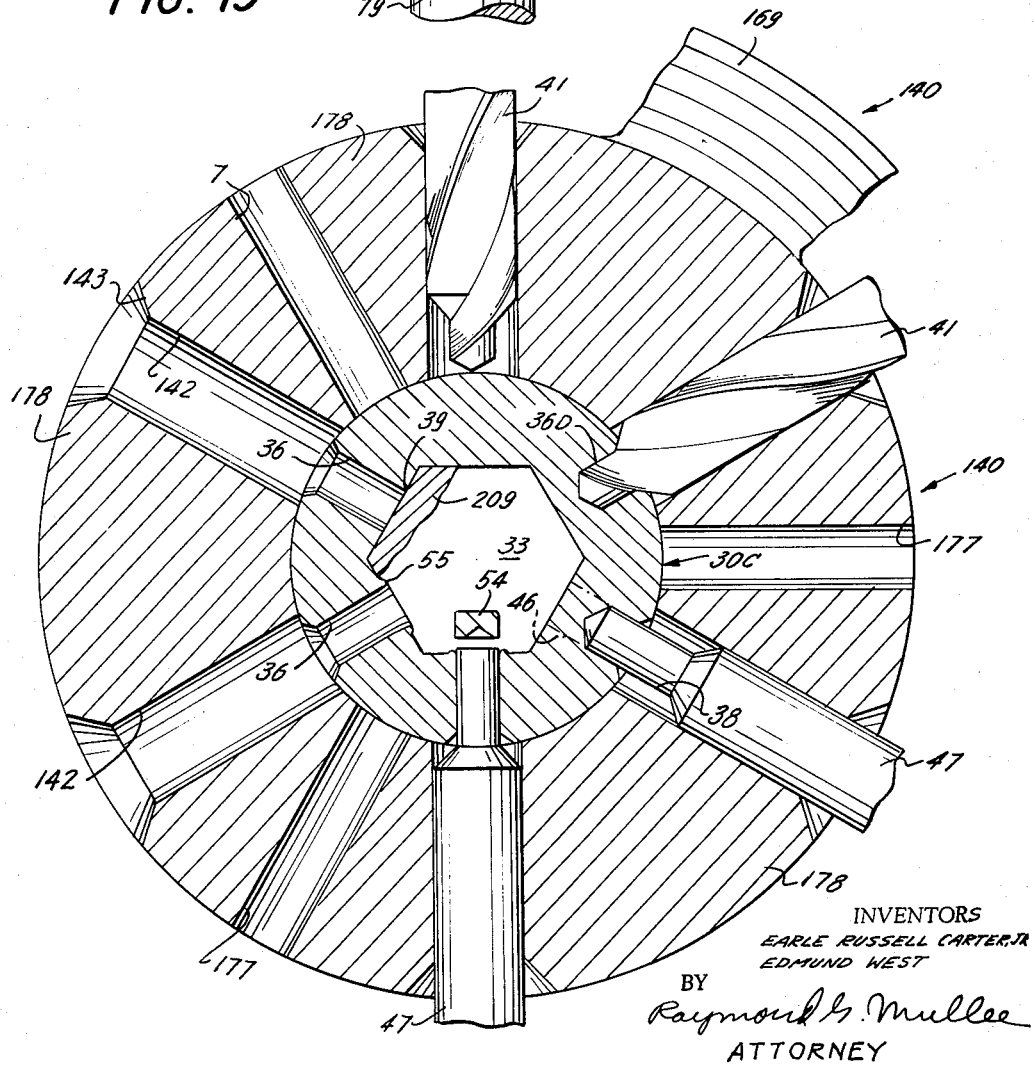
FIG. 19

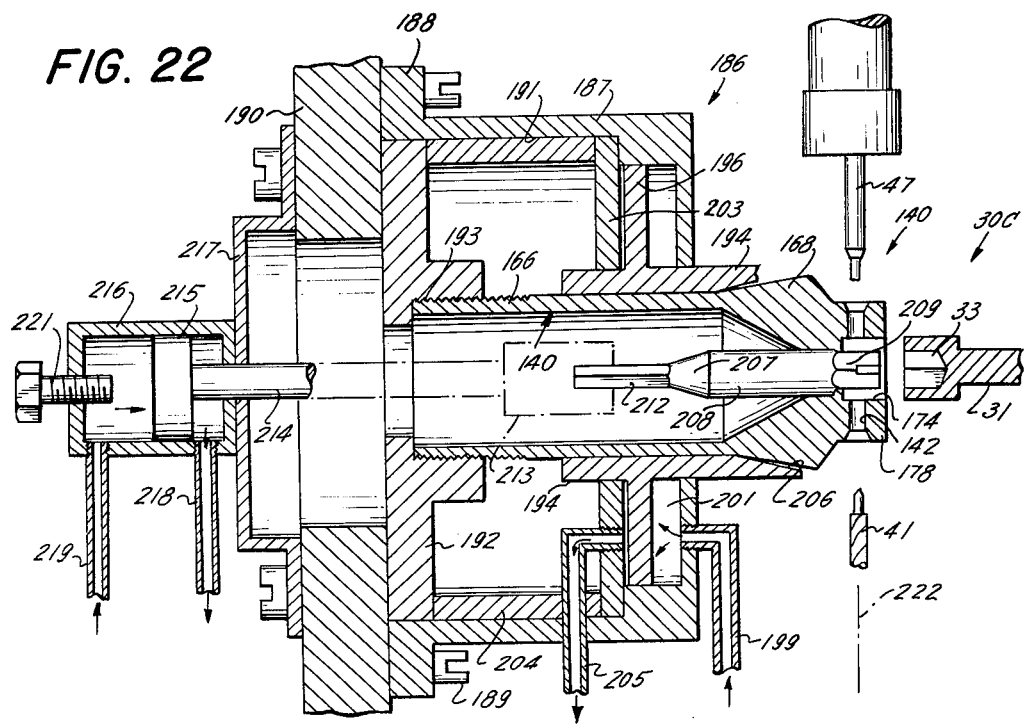

3,204,266
METHOD AND APPARATUS FOR FORMING CROSS HOLES THROUGH SOCKET HEAD SCREWS
Earle R. Carter, Jr., Bloomfield, and Edmund West, Glastonbury, Conn., assignors to The Allen Manufacturing Company, Hartford, Conn., a corporation of Delaware
Filed Apr. 29, 1963, Ser. No. 276,545
15 Claims. (Cl. 10—2)

This invention relates to methods and apparatus for the production of holes in metal walls which are accessible for drilling from one side only, without creating a burr on the inaccessible side. The invention is particularly applicable to radial holes in a wall that surrounds a cavity or socket, this type of structure being referred to for convenience as an annular wall.

In one industrial application of the invention, the annular wall is constructed as an integral part of a socket head cap screw, the outside of the wall being cylindrical and the inside consisting of six flat faces which define the socket for the reception of a hex key for driving the screw. It is sometimes required, by the purchaser of the cap screw, that the socket head be provided with one or more pairs of alined radial holes for the reception of a wire. The wire is inserted after the cap screw has been tightened and protects it against loosening either by vibration or by tampering.

The usual method of forming a cross hole in a socket head cap screw is to employ a helical fluted drill to penetrate the annular wall from the periphery through the inner face to the socket in one continuous operation. As the drill cuts, it pushes some of the metal forward resulting in a jagged cylindrical rim or burr at the socket end of the cross hole. The burr is objectionable for several reasons, mainly because of the danger that eventually some part of it will break loose under vibration and fall into an adjacent device, such as a pump, instrument or delicate control apparatus used on aircraft or missiles, where a loose metal particle may cause extensive damage. For this reason, it is customary to remove the burr by a series of metal working operations including grinding, milling, cutting, drilling, bending and the like, which require the expenditure of considerable time by the worker, and therefore increase the manufacturing cost of the cap screw.

Furthermore, the tools used in the series of deburring operations are dependent upon the manual dexterity and patience of the workman, with a resulting variance in the degree to which the burr is removed. The lack of uniformity, in turn, adds to the cost of inspection, which is considerable as there may be as many as six cross holes on a single cap screw. The inspection must be done by skilled technicians responsible for the protection of delicate apparatus associated with the cap screw and the examination at the factory where the screws are made is duplicated by the inspectors in the procurement agency or purchasing department established by the user of the cap screws for its own protection. A discriminating purchaser, on finding an unsafe screw, may reject an entire shipment. For some of the industrial uses of the cross drill cap screw, the danger of lose particles of metal is not as great, and the requirements for complete deburring are not as exacting, as they are in other industrial or scientific applications. However, it is not feasible to set up two standards for deburring, or two standards for inspection, or two sets of inventories, as there is a possibility of commingling the imperfect cap screws with those destined to be used on delicate apparatus. For this reason, it is customary to understake the effort and expense aforesaid on all cross drill cap screws, including those where the cost of a perfect hole is not warranted and cannot be passed on to the ultimate consumer.

An object of the invention is the production of a cross hole in a socket screw without the accompanying formation of a burr at the socket end of the hole, thus obviating the usual deburring operations.

Another object is the production of cross holes with mechanical precision and uniform high quality, without dependence on the skill or patience of the worker, thereby minimizing the work of inspecting the finished screws and the danger of a rejection based on an occasional imperfect screw.

The present invention results from the discovery that when the usual drill is replaced by a punch, the metal that is displaced at the socket end of the hole has new and unexpected characteristics. Nearly all of the metal dislodged by the punch falls into the socket as a single intact large slug which is readily removed. Any metal not integrated into the slug remains as a permanent part of the annular wall surrounding the socket and without any danger of later disintegrating or forming any loose chips, as would be the case if the socket were penetrated by a drill leaving a burr.

A further object of the invention is to minimize wear and breakage of the tools that produce the cross hole. In accordance with this invention the cross hole is produced partly by drilling and partly by punching.

A still further object is the provision of an improved method and apparatus for countersinking the outer end of the cross hole, with greater precision and at reduced manufacturing cost. In one arrangement, the countersinking is performed simultaneously with the drilling; in an alternative arrangement, by the punch immediately after breaking into the socket. In a third alternative, the countersink is produced partly by the drill and partly by the punch.

Still another object of the invention is the provision of improved means for supporting and indexing the socket screw blank in proper relation to the drills and punches. A feature of this invention is an arrangement for simultaneously drilling several incomplete cross holes in the same workpiece and then simultaneously punching the same holes through to the socket, and then simultaneously burnishing the inner ends of the holes. Another feature of the invention is a hex key adapted to project into the cap screw socket and arranged to perform the functions of centering and indexing and finally burnishing the workpiece.

Another feature of the invention is a chuck having a novel collet, the jaws of which are perforated in the region which grips the workpiece or socket screw blank, thereby providing access for the drills and punches through the jaws to the workpiece and also centralizing the drills and punches.

A further object of this invention is a new method of manufacturing the collet which insures that the perforations in the jaws will be at the proper angle to guide the drill or punch when the collet is closed upon the workpiece.

Other objects and features of this invention will appear more clearly from the following description, taken in connection with the accompanying drawings and appended claims.

Several alternative methods and alternative apparatus for manufacturing a cap screw according to this invention are illustrated in the accompanying drawings in which:

FIG. 6 is an enlarged cross section of a socket head cap screw divided into three sectors, each sector having a drill hole as in FIG. 3, and a completed hole as in FIG. 4, each drill hole receiving a punch, the diameter of the punch in the three sectors being respectively equal to, smaller than, and larger than the drill hole;

FIG. 7 is a front view of a drill press having apparatus for the practice of this invention, the view being chiefly in elevation and partly in longitudinal section to show the cap screw workpiece at the end of the drilling operation;

FIG. 8 is a similar view of the drill press with the parts in a different position and with the workpiece at the end of the punching operation;

FIG. 9 is a fragmentary view on a larger scale of the workpiece in the condition illustrated in FIG. 8;

FIG. 10 is a view similar to FIG. 9 but with the workpiece at a later stage of operation;

FIG. 11 is a longitudinal section on the line 11—11 of FIG. 12, showing the apparatus for supporting and indexing the cap screw workpiece;

FIG. 12 is an end view of the same apparatus as indicated by the arrows 12 in FIG. 11;

Figure 20:
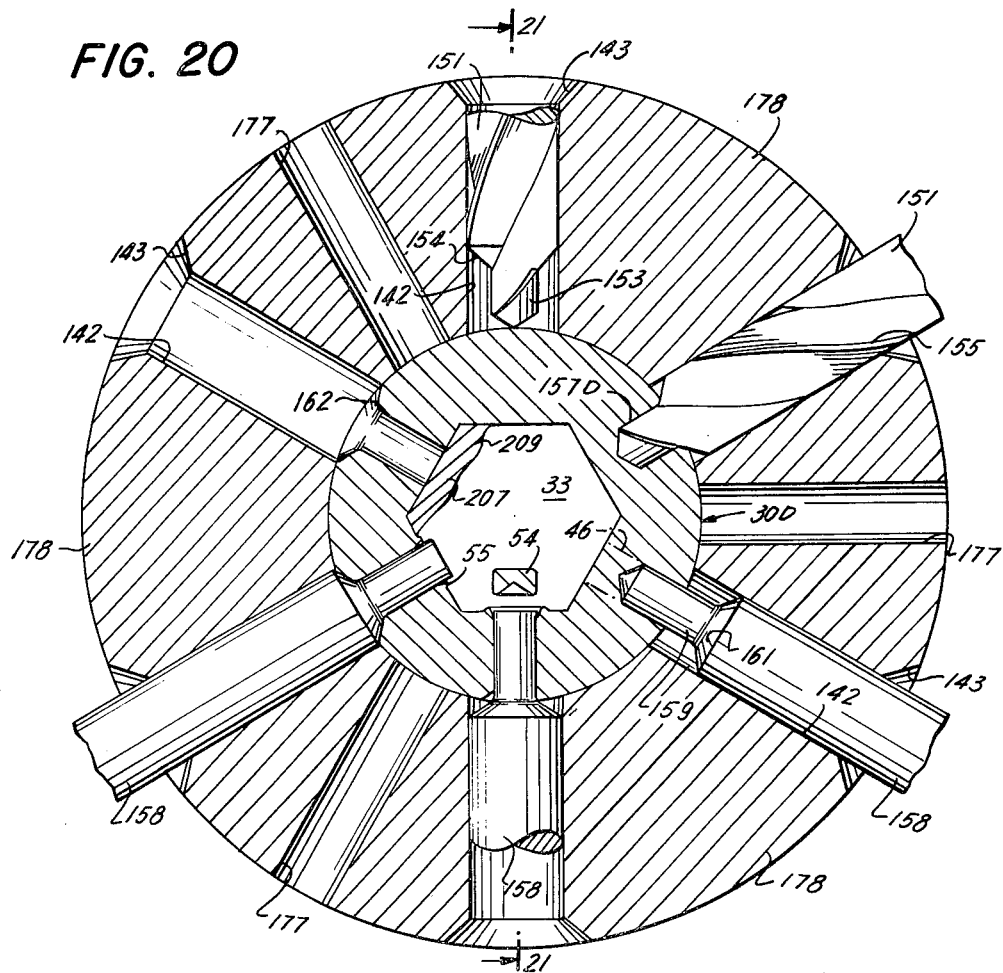
Figure 21:
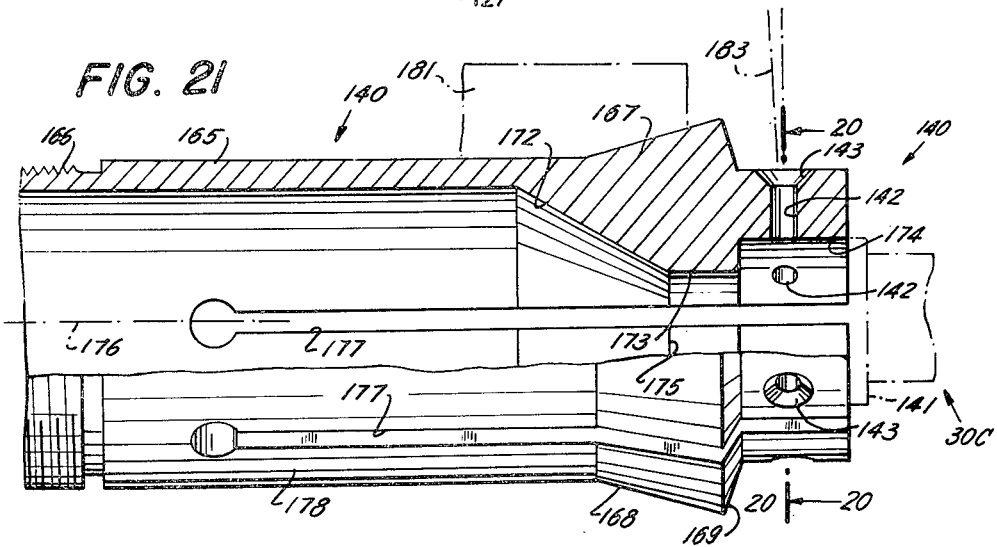

FIG. 13, which relates to a modified process, is an end view, partly in cross section, of a socket head cap screw workpiece as seen from the shank end, showing a pair of drills at the start of the first step;

FIG. 14 is a view similar to FIG. 13 with the drills at the end of the first step;

FIG. 15 is a view similar to FIGS. 13 and 14 but showing a pair of punches inserted in the drilled holes at the start of the second step;

FIG. 16 is a side view, partly in longitudinal section, of the workpiece involved in the process of FIGS. 13, 14 and 15, in association with an indexing hex key, showing the workpiece at the end of the second step with the punches breaking through into the socket; and also showing in dot dash position the inner end of the hex key at the termination of the burnishing step;

FIG. 17 is a view similar to FIGS. 13, 14 and 15, with the workpiece at the end of the third step of the process in which the punches have continued their inward movement to form countersinks at the outer ends of the cross holes;

FIG. 18 is a view similar to FIG. 17 showing the workpiece during the forward step of the process with the hex key being reciprocated in the socket to burnish or smooth out the irregular surface deformations at the inner ends of the cross holes;

FIG. 19, which shows a modified apparatus for the manufacture of a workpiece, is a cross section of a socket head cap screw workpiece supported in an apertured collet arranged to cooperate with a drill, a punch and a hex key in a manner similar to that of the first method (in which the countersink is performed near the end of the drilling operation) each sector of the workpiece being in a different stage of operation progressing clockwise, the view also showing schematically the depth control for the drill;

FIG. 20 is a view similar to FIG. 19 but modified to illustrate another alternative method in which the countersinking is performed in part at the end of the drilling operation and is completed at the end of the punching operation;

FIG. 21 is a view of the collet partly in elevation, partly in longitudinal section, and partly broken away, the collet jaws being held in closed condition as in FIGS. 19 and 20;

FIG. 22 is a longitudinal section of the collet and hex key in position to receive a socket head cap screw workpiece, showing schematically the chuck housing and related structure for supporting the collet on a fixture, as well as the fluid pressure means for holding the hex key extended and the collet jaws open; and FIG. 23 is a view similar to FIG. 22 with the workpiece at the end of the punching operation, the hex key being retracted and the collet jaws closed.

Figure 1:
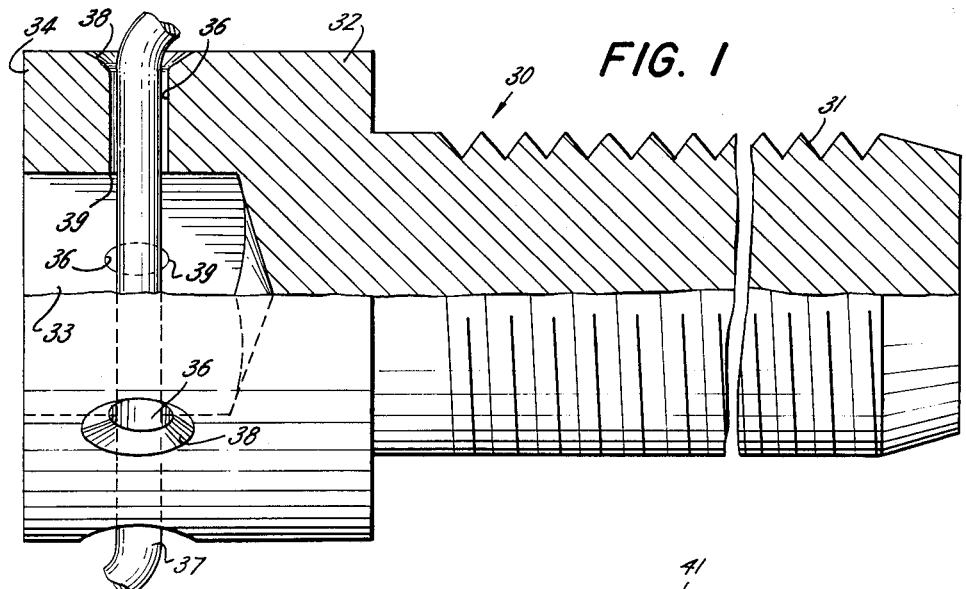
FIG. 1 is a view partly in elevation and partly in longitudinal section of a socket head cap screw embodying this invention in association with a wire threaded through a pair of aligned cross holes.

Referring to FIG. 1, the illustrative cap screw 30 has the usual threaded shank 31 to which is integrally attached a head 32. The head has a socket 33 which may be of any desired shape, circular or non-circular. In the illustrative embodiment, the socket has the shape of a regular hexagonal prism and is adapted to receive the usual hex key (not shown) by means of which the screw may be driven. The annular wall 34 surrounding the socket has a cylindrical periphery and is divided into six sectors, each having a flat face 35, the six faces defining the periphery of the socket. One or more pairs of opposite wall sectors are provided with aligned cross holes 36 for the reception of a wire 37. As shown, each cross hole 36 is perpendicular to a flat face 35, but if desired, may be located at the corner joining two adjacent flat faces. The wire is threaded or passed through the aligned cross holes after the cap screw 30 has been tightened, and serves as a locking device to prevent the screw from becoming loose either accidentally, as a result of vibration, or by unauthorized use, in which case the broken wire may serve as evidence of tampering with the instruments associated with the cap screw. Usually, the same wire is passed through a plurality of screws and may be straight or may be bent as shown. In order to prevent a wire, and especially a bent wire, from being cut or subjected to fatigue stresses under vibration, the cross hole is provided with a countersink 38 at its outer end.

The inner end of the cross hole 36 meets the flat face 35 along a circular edge 39 which is smooth and free from any rough or serrated edges which might otherwise cut the wire, and, more important, free from any projection or burrs which otherwise might break loose and become dislodged from the cap screw and fall into an adjacent instrument or delicate apparatus (not shown) where the loose metal chips might cause extensive damage. The smooth edge 39 is formed as a result of a novel method of penetrating through the flat face 35 into the socket 33 when the hole 36 is fabricated and does not require any subsequent countersinking, drilling, grinding or other metal removal operation at the inner end of the cross hole.

In accordance with this invention, the cross hole 36 is fabricated by first drilling the outer portion of the hole for a length somewhat less than the thickness of the annular wall 34, thereby leaving an uncut solid web between the inner end of the drill hole and the socket 33, then removing the drill and replacing it with a punch, and then forcing the punch through the flat face 35 to eject the web 46 as a slug 54 into the socket 33 and to complete the cross hole 36. By punching through the face 35, instead of drilling therethrough, the present invention avoids the formation of a burr attached to the face at the inner end of the cross hole. The invention also makes it possible to form the countersink 38 at the outer end of the hole at the same time that it is being drilled, or at the same time that it is being punched.

For convenience in description, and without implying any limitation on the scope of the invention, the various embodiments and species of the invention or inventions may be generally grouped as follows:

Method species I—drilling, simultaneous drilling and countersinking, punching, shown in FIGS. 2, 3, 4, 6 to 10 and 19;

Method species II—drilling, punching, countersinking with punch implement, shown in FIGS. 13 to 18;

Method species III—drilling, simultaneous drilling and countersinking, punching, countersinking with punch implement, shown in FIG. 20;

Apparatus species IV—drill press type, shown in FIGS. 6 to 18;

Apparatus species V—collet type, shown in FIGS. 19–23.

It will be understood, however, that the invention may be practiced without any countersinking; also that further modifications may be made in both apparatus and method.

Figure 2:
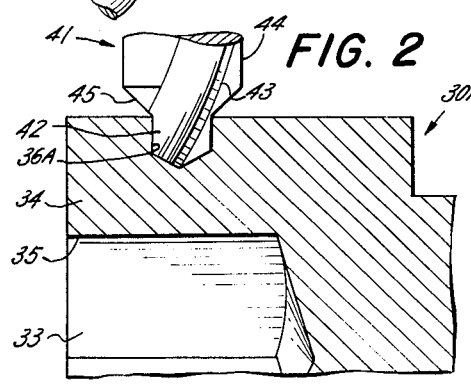
FIG. 2 is a fragmentary longitudinal section of a cascrew blank at the end of the first stage in the process of manufacture in which a part of the hole has been drilled at a uniform diameter.

Referring to the species I method, and especially to FIG. 2, a socket head cap screw blank 30A is supported with its annular wall 34 interposed in the path of a drill 41. The lower portion 42 of the drill has the usual conical point and spiral flutes 43 and is arranged to drill the outer portion 36A of the cross hole in the conventional manner. The drill 41, however, is unconventional in that it has an upper enlarged portion 44 connected to the lower portion by a frusto-conical shoulder 45, and the helical flutes are continued beyond the frusto-conical portion to the upper portion.

In the first stage of the species I process, which terminates with the drill in the FIG. 2 position, the cross hole portion 36A is drilled at a uniform diameter and to an axial distance corresponding to the length of the lower portion 42 of the drill. During the second stage, the cross hole is extended in distance and simultaneously is countersunk to enlarge the hole to the size illustrated in FIG. 3. The enlarged drill hole 36D still has a length that is less than the thickness of the wall sector 34 and leaves a solid uncut web 46 between the inner end of the drill hole 36D and the socket 33. Preferably, the web has an axial thickness, measured at the cylindrical wall of the hole 36D, which is no greater than the diameter of the latter. After drilling the hole 36D to a predetermined depth, the drilling action is terminated, by means to be described later, and the drill 41 is removed from the enlarged, but still incomplete, cross hole 36D. A punch 47 is then inserted in the hole 36D and during the movement of the punch into position, the countersunk surface 38 may act as a guide or centralizer. The punch has an upper portion 49 of relatively large diameter, and a lower portion 51 of relatively small diameter. Preferably, the lower and upper portions of the punch are equal in diameter to the corresponding portions of the drill 41 thereby resulting in a running fit respectively with the drill hole 36D and with a larger bore 52 provided in a guide bushing 53 (FIGS. 6 and 9). This arrangement assures precise alignment of the punch axis with the axis of the drill hole 36D. The punch is lowered from the FIG. 6 position to the bottom of the drill hole and is then in condition for performing the third step in the hole forming operation.

Figure 4:
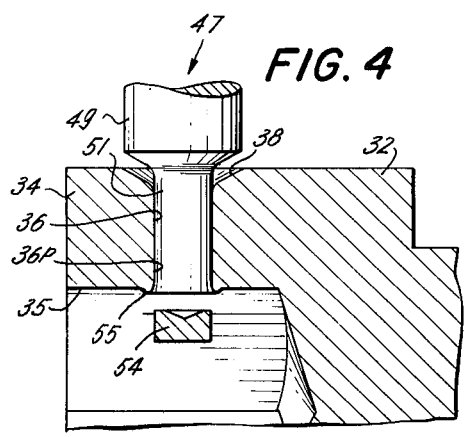
FIG. 4 is a fragmentary longitudinal section of the cap screw blank at the end of the third stage during which the hole has been completed by punching through the web into the socket.

In the third step, the punch 47 is subjected to hydraulic or pneumatic pressure and transmits the force to the solid web 46. When the punch force attains a value corresponding to the shear strength of the web 46, the latter suddenly yields, breaks loose from the remainder of the annular wall 34 and is ejected into the socket 33 in the form of a slug 54 as shown in FIG. 4. The present invention is based on the discovery that the web 46 remains intact upon being ruptured and dislodged from the wall sector 34 and has substantially the same volume and mass as a slug that it had as a web, with all of the web metal being integrated into the slug 54 which can be conveniently removed, and none of it being disintegrated. Any metal not transferred to the slug remains as a permanent part of the socket wall 34 with no danger that it will be dislodged accidentally or become a loose particle later. The reason for this phenomenon is not definitely known but is believed to be due to the fact that the shearing stresses are concentrated along a circle at the front end of the punch and are transmitted from the drilled side of the web to the socket side, causing the web to make a clean break, and leaving a punched extension 36P of the cross hole which extension has substantially the same diameter as the drill hole 36D. At its inner end, the punch extension 36P flares radially to a bell-mouth shape as shown in FIG. 6. The slug 54 is slightly greater in diameter and slightly less in axial width than the web 46 from which it was produced.

At the end of the third step, as shown in FIG. 4, the cross hole is complete and does not require any finishing operations. That is to say, the cap screw blank 30A, following the formation of another cross hole 36 or cross holes in like manner, requires only the usual unrelated steps (such as threading, heat treating and plating) to condition it for use, without danger that the cross hole will cut the wire and without any danger of dislodgement of burrs or loose pieces of metal resulting from either drilling or punching. Close examination under a magnifying glass, however, reveals that the circular edge where the inner end of the punched extension 36P joins the flat face 35 of the socket is not sharp but has been deformed slightly to the shape of a smooth continuous ring 55 of uniform cross section throughout its circumference. This surface deformation is not objectionable because it would not obstruct the insertion of a hex key into the socket for applying torque to the screw. What is even more important is that the ring would remain intact throughout the useful life of the cap screw without danger of falling off, chipping or breaking loose. The smooth deformation 55 should not be confused with the large ragged burrs that are produced by drilling into the socket in the conventional prior art process. One of such burrs 56 which resembles a ragged sleeve, is shown on the inner end of the drill hole 57 in the cap screw blank 58 in FIG. 5. Such a burr 56 not only would obstruct the hex key but also would present a continual danger of the jagged edges breaking loose and causing damage as previously described. There is no known simple, inexpensive method of removing the conventional burr 56. Usually, a drill or de-burring tool (not shown) is inserted into the socket 59 and is manipulated by a skilled worker who tries to run the grinding end of the tool around the circumference of the burr for several revolutions. The grinding operation is supplemented by metal bending steps in which part of the burr 56 is forced from the socket 59 into the drill hole 56 and later from the drill hole back into the socket, the metal bending and milling operations being resorted to alternately. The skilled workers who perform the de-burring steps do not all perform work of uniform quality, especially when their patience is taxed by the time consuming, inefficient conventional method. Accordingly, it is necessary for the inspectors, both at the factory of the screw manufacturer and in the purchasing department of the user, to examine each cross hole very carefully, frequently as many as six holes on a single cap screw. The present invention simplifies the work of inspection as well as of manufacture because it substitutes the uniformity, precision and efficiency of a machine for the manual methods above described.

Figure 5:
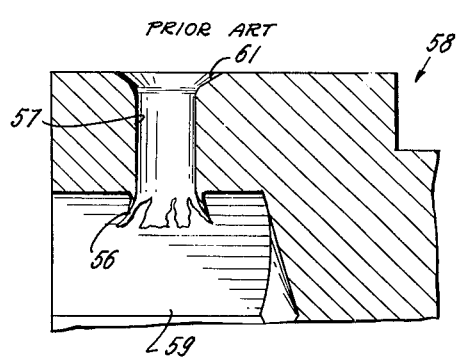
FIG. 5 is a fragmenary longitudinal section of a cap screw blank being fabricated in accordance with conventional prior art practice subsequent to the drilling and countersinking operations, but prior to the series of steps or additional operations required for the removal of the annular burr at the inner end of the cross hole.

Still referring to the prior art cap screw blank 58 of FIG. 5 the countersink 61 at the outer end of the drill hole 57 has the shape of a frustum of a cone whose axis is not precisely aligned with the axis of the drill hole 57. The eccentricity is due to the fact that the countersinking tool (not shown) is separate from the drilling tool (not shown) and is aligned with the drilled hole by a "hit-or-miss" method. In practicing the conventional prior art process, it is not feasible to drill and countersink at the same time because of the excessive breakage of the drills when the front end suddenly penetrates into the socket thereby causing an abrupt reduction in the resistance to the axial movement.

On the other hand, in the practice of the present invention, simultaneous drilling and countersinking and, therefore, perfect alignment are feasible because the drill is never required to, or permitted to, penetrate into the socket 33.

At the end of the punching operation, the cross hole 36 has a shape and combination of surface portions which appear, under high magnification, as shown in the two o'clock position in FIG. 6. The punched portion 36P is represented by longitudinal lines 63 corresponding in axial length to the thickness of the web 46 and show the path followed by the lower end of the punch 47 as it dislodged the web. Preferably, this axial length is no greater than the diameter of the lower portion 51 of the punch thereby prolonging the life of the punch. The drilled portion 36D of the hole is represented by transverse lines 64 and represent the approximate direction of the circumferential abrasions produced by the flutes 43 when reaming the cylindrical and frusto-conical surfaces of the drill portion 36D.

As mentioned previously, the lower or forward portion 51 of the punch has the same diameter as the corresponding portion 42 of the drill whereby the punched extension 36P of the cross hole appears to be a smooth, unbroken continuation of the drill hole 36D as shown in the two o'clock position of FIG. 6. The punch may be modified by slightly reducing the forward diameter, as in the case of the punch 51S shown in the four o'clock position of FIG. 6. The smaller punch produces a punch hole 36PS which, of course, is smaller in diameter than the adjacent drill hole 36D but the difference in diameter is not objectionable. The advantage of the smaller diameter punch is that it avoids friction between the peripheral surface of the punch and the cylindrical surface of the drill hole 36D and thereby prolongs the life of the punch.

Another modified punch is shown in the eight o'clock position of FIG. 6 where the forward portion 51L has a diameter slightly greater than that of the drill hole 36D. The effect is to ream the drill hole to a large diameter and then to shear off the web 46. The complete cross hole 36PL has a uniform diameter slightly larger than that of the drill hole 36D and extending from the countersink 38A to the socket 33. Under a microscope, the entire hole 36PL, inwardly of the countersink, appears to have been formed by punching rather than drilling. The purpose of using an oversize punch 51L is to provide an air seal between the punch periphery and the drill hole 36D and thereby trap the air in front of the punch in the chamber 67. The oversize punch acts as a piston, and the trapped air in the chamber 67 builds up pressure until the front end of the punch engages the web with metal-to-metal contact along a circle of the same diameter as the drill hole 36D. The web is dislodged by a combination of the shearing action of the punch on the circle of contact and the fluid pressure acting within the circle against the entire cross section of the web. The fluid pressure action is comparable to that of a pop-gun. It has been found in some instances that the web is removed more effectively, more quickly and with less surface irregularity when it is ejected by a combination of punching and fluid pressure over its entire cross section instead of by metal-to-metal contact alone.

Referring again to the punch 51 in the twelve o'clock position of FIG. 6, the advantages of the oversize punch are not realized completely because some of the air in the chamber 68 below the punch escapes between the punch periphery and the surface of the drill hole 36D. However, if the punch has a close fit with the drill hole, the escape of air is relatively slow and enough air pressure builds up in chamber 68 to realize the advantages of an oversize punch to a lesser degree. The close fitting arrangement shown in the twelve o'clock position is the one that has been adopted for commercial use as it represents a compromise between the oversize punch with air piston effect and the undersize punch with longer life.

One form of apparatus for supporting the workpiece 30A relative to the drill and punch, and also for performing a finishing operation, will now be described. It is designed to be mounted on a drill press and is referred to above as apparatus species IV. The drill press shown in FIGS. 7 and 8 comprises a fixture 70 which includes a horizontal table 71, a vertical post 72 and a vertical column 73. A ram 74 is arranged for vertical reciprocation in the column and detachably supports, at its lower end, a punch holder 75 which in turn detachably supports the punch 47. The upper end of the ram is connected to a piston 76 provided with fluid pressure means (not shown) for alternately raising and lowering the piston, ram, punch holder and punch in unison. The vertical post 72 supports a drill head casing 77, in which is mounted for vertical adjustment an outer cylinder or quill 78. A spindle 79 is carried by the quill for vertical and rotary movement in unison with the quill. The lower end of the spindle drives a chuck 81 which in turn drives the drill 41. Any well known means may be provided for raising and lowering the quill, and for driving it, for example, as shown in U.S. Patent 2,154,745 granted to Hedgpeth on April 18, 1939. In order to limit the downward movement of the quill 78, an outrigger collar 82 is secured thereto and carries a vertical threaded rod 83 which extends through an apertured ear 84 on the drill head casing 77. A nut 85, mounted on the threaded rod, and adapted to seat on the ear, provides an adjustable stop for arresting movement of the drill 41 after it has moved within a predetermined distance of the axis of the workpiece 30A. A lock nut 86 secures the nut in adjusted position.

The workpiece 30A, which is a cap screw blank, is supported on a horizontal axis in the same plane as the axes of the drill 41 and punch 47. In accordance with this invention, the socketed head of the blank is moved alternately into the path of the drill and that of the punch. For this purpose, the workpiece is supported at its opposite ends by a carriage assembly 87. The latter includes a bed plate 88 of rectangular cross section, slidably mounted in a channel guideway 89 in the horizontal table 71. Secured to the bed plate 88, by cap screws 91, is a front bracket 92. Near its upper end the bracket is bored to receive a front shaft 93 which has a frusto-conical recess 94 at its front end adapted to receive and center the frusto-conical end 95 of the shank of the workpiece 30A, as shown best in FIG. 10. The rear end or head end of the workpiece is supported against axial movement by a thrust washer 96 seated in a counterbore 97 in a quill shaft 98, as shown in FIGS. 9 and 11. The workpiece is held in axial alinement with the quill shaft by a hex key 99, the construction and functions of which will be explained later. The hex key 99 forms an extension of a rod 101 which is mounted for limited reciprocation in the quill shaft 98. The quill shaft is journaled in a pair of bushings 103 supported in a split axle box 105 (FIGS. 11 and 12). The latter is secured by cap screws 106 on top of an intermediate bracket 107 which is fastened to the bed plate 88. A rear bracket 109, also fastened to the bed plate, supports a pneumatic ram 111 having a piston (not shown) connected to the rod 101.

From the foregoing description, it is seen that the bed plate 88, upon being shifted from the FIG. 7 position to the FIG. 8 position, will carry the three brackets 92, 107 and 109 in unison therewith and maintain the front shaft 93, thrust washer 96 and hex key 99 in contact with the workpiece 30A as the latter is moved out of the path of the drill 41 and into the path of the punch 47. Also partaking of the shifting movement, and forming part of the carriage assembly 87, is a jig 113, the rear end of which is attached to the top of the axle box 105. The front end of the jig supports the guide bushing 53 (FIG. 9) which is adapted to be shifted alternately into registry with the drill 41 and punch 47.

In order to insert or remove a workpiece 30A in proper position in the carriage assembly 87, and thereafter to hold it in that position, the front shaft 93 is arranged, at its front end, to abut against an eccentric 114 connected to a handle 115. After the handle has moved to the position shown in full lines in FIG. 7, it is held in axial alinement with the front shaft 93 and the quill shaft 98, and also is held in proper rotative position relative to the drill 41 and punch 47 by means of a novel centering and indexing means which will be described presently.

Referring particularly to FIGS. 9 and 11, the hex key 99 is an important feature of this invention and performs several functions. The front end of the key projects beyond the thrust washer 96 usually for a short distance. The upper face of the hex key is disposed in a horizontal plane with the result that the workpiece is indexed to a position in which the upper flat face 35 of the socket 33 is at right angles to the drill 41 or punch 47 as the case may be. In order to index the hex key, aong with the workpiece, to drill a new cross hole without removing the workpiece from the carriage, an indexing knob 117 (FIG. 8) is provided. The knob may be integral with the quill shaft 98 or rigidy attached thereto. The quill shaft has a splined connection 118 with the rod 101 whereby the rotary movement of the indexing knob is imparted to the hex key 99.

The indexing knob 117 has a pair of handles 119, diametrically opposed, each extending at a right angle to one of the flat faces on the hex key 98. By turning the knob 180° to transpose the handles, upon completion of a cross-hole in a workpiece, the operator may position the latter for the production of a second cross hole in line with the first.

In order to let the operator know when the indexing knob 117 has been turned through the precise angle required for a subsequent operation, a yieldable locking device is provided in the split axle box 105. It includes a collar 121 keyed to the quill shaft 98 and confined between the bushings 103. The collar has a plurality of depressions 123 each adapted to register with a plunger 124 which is urged toward the collar by a spring 125 supported in an adjusting screw 126 threaded into the wall of the axle box 105. As shown, there are three pairs of plungers and associated springs and screws, all mounted in the same horizontal plane as the axis of the collar 121 and all extending radially. However, only one pair of depressions is located in the same plane, the second and third pairs (not shown) being displaced angularly by 90° and 60° respectively. As shown in FIG. 11, the screws in the first pair are tightened to cause the plungers 124 to penetrate into the depressions 123 and thereby provide a yieldable lock which inhibits turning of the collar 121 and, therefore, of the indexing knob 117 and hex key 99. When the operator desires to index the workpiece to a new position, he grasps one of the handles 119 and turns the knob to force the plungers 124 out of the depressions 123. Thereafter, the indexing knob offers very little opposition of turning until it has turned 180 degrees and the plungers register with a new set of depressions, whereupon the operator hears a clicking sound and notices that the indexing knob is again yieldably locked. FIG. 11 shows the adjustment of the screws to adapt the indexing device for the manufacture of only one pair of cross holes in the workpiece, the number of which, of course, varies to suit the requirements of the purchaser. If two or three pairs of cross holes are required, then, of course, two or three pairs of adjusting screws 126 are tightened after which the operator turns the indexing knob either 90° or 60° between hole forming operations.

In the use of the drill press type of apparatus (species IV), the operator first indexes the hex key 99 to a yieldingly locked position, then places the socket end of the workpiece 30A (cap screw blank) over the front end of the hex key 99 and then moves the handle 115 to the full line position of FIG. 7, thereby holding the rear end of the workpiece firmly against the thrust washer 96. The entire carriage assembly 87 is moved horizontally relative to the fixture assemby 70 until the bushing 53 in the jig 113 registers with the drill 41. The drill, which is rotating continuously, is lowered through the bushing and into the contact with the workpiece and immediately starts drilling the cross hole. After the drill has penetrated to the FIG. 2 position, it starts to form the countersink 38. Simultaneous drilling and countersinking occurs until the drill attains the position shown in FIG. 3 leaving a thin web 46 between the drill hole 36D and the socket 33. At this time, the threaded nut 85 (FIG. 7) abuts against the ear 84 on the drill head casing 77 to limit the downward movement of the drill, thereby leaving an uncut web 46 (FIG. 3) between the drill hole 36D and the hexagonal socket 33. The depth of the drill hole and, therefore, the thickness of the web, may be controlled accurately by adjusting the nut 85. The drill 41 is lifted from the hole 36D and the operator then indexes the workpiece 30A, as previously described, and repeats the drilling operation. After drilling the required number of holes, the operator manipulates a lever (not shown) to raise the spindle 79, chuck 81 and drill 41 to pull the latter out of the drill hole 36D and bushing 53. The carriage assembly 87 is then shifted until the bushing 53 registers with the punch 47 and the socket head of the workpiece 30A is now in position for the next step of the hole forming operation.

The operator then manipulates a set of valves (not shown) to actuate the pneumatic ram 74 which causes the punch 47 to descend through the bushing 53 and into the drill hole 36D. Registration of the punch axis with the drill hole axis is facilitated by the countersink 38, also by a similar countersink or chamfer 128 at the upper end of the bushing 53. After the lower end of the punch 47 is moved to the botom of the drill hole 36D, its downward motion is temporarily arrested but the air pressure in back of the ram piston 76 suddenly increases and forces the punch to the position shown in FIGS. 4 and 9, thereby dislodging the web 46 from the workpiece and ejecting it into the socket as in the form of a slug 54, as previously described. The air supply to the pneumatic ram 74 is then reversed to lift the punch 47 out of the bushing 53 thereby permitting the workpiece 30A to be indexed to a new position to punch the web 46 from the next hole.

At this stage, the cross hole 36, including the drilled portion 36D and punched extension 36P, is complete and serviceable. However, it is desirable to finish the surface of the inner end of the cross hole by smoothing out the slight deformation 55 shown in FIG. 4. The finishing operation is performed with the aid of the hex key 99. Referring to FIGS. 8 and 9, the hex key 99 at this stage of operation is still in its rearward position where it projects only slightly into the socket 33 of the workpiece. This is the position that the hex key occupied during the drilling, carriage shifting and punching steps of the operation in order to prevent any interference with the movement of the drill or of the punch. After the punch has been removed from the workpiece, the operator supplies live air to the ram 111 (FIG. 8) which moves the rod 101 forward to cause the hex key 99 to penetrate further into the workpiece socket 33 by moving from the FIG. 9 to the FIG. 10 position. The hex key has a cross section complementing that of the hexagonal socket 33 and therefore the key, as it slides in the socket, forces the slight deformation 55 back in to the adjacent wall portions of the workpiece, and thereby re-forms the surface of the hexagonal socket 33 rendering it smooth by a burnishing action. Usually, one stroke of the hex key is sufficient for this purpose but the strokes may be repeated if desired. The hex key 99 is then moved to its rearward position shown in FIG. 9, the handle 115 is swung to release the finished workpiece 30, and the carriage 87 is shifted to drilling position to start operating on a new workpiece.

From the foregoing description, it is seen that the hex key 99 functions as a centralizing device, also as an indexing device and also, but at a different time, as a burnishing implement. The burnishing operation consists primarily of sizing the hexagonal socket 33, rather than the cutting away or removal of metal, as in the case of the deburring tools that are required when the hole is drilled according to the prior art process.

FIGS. 13–18 illustrate an alternative method (species II) which is compatible with the drill press type of apparatus (species IV) as well as other kinds and types of apparatus. The workpiece 30B is positioned with its axis, and with one of its socket faces 35, at right angles to the axis of the guide bushing 53. A drill 131 adapted to be driven by the chuck 81 (FIGS. 7 and 8) is mounted for relative rotary and reciprocating movement in the bushing 53. The drill has upper and lower portions corresponding in diameter to those on drill 41 and also has a series of helical flutes 132 extending over at least the lower portion and designed to cut or drill in a well known manner. The lower portion of drill 131 has an axial length greater than that of the lower portion 42 of the drill 41 in order that it may complete the drilled portion of the cross hole at a uniform diameter without any simultaneous countersinking. During the first step of the hole forming operation, the drill 131 moves from the FIG. 13 to the FIG. 14 position to produce the drilled portion 133D of the cross hole, the inner end of which is separated from the socket 33 by a solid web 46, as in the method species described previously. The depth of the drill hole 133D and therefore the thickness of the web 46 is controlled by the adjustable setting of the nut 85 (FIG. 7). Preferably, the web 46 has a thickness no greater than the drill hole diameter. The drill 131 is then removed and replaced by a punch 135, for example, by shifting the carriage assembly 87. The punch 135 is then subjected to pressure by the piston 76 and moves from the FIG. 15 to the FIG. 16 position. The web 46 is then ruptured or dislodged from the annular wall 34 by the shearing action of the punch and is ejected into the socket 33 as shown in FIG. 16. The solid mass of the web 46 is not disintegrated or deformed but remains intact as a detached slug 136 having a shape comparable to that of the slug 54 above described. The space in the wall 34, which was previously occupied by the web, is now replaced by a punched portion 133P. The drilled portion 133D and the punched portion 133P of the cross hole 133 have the same diameter and appear to be a continuous smooth uninterrupted hole 133. In order to detect that the hole 133 is composed of more than one portion or section, it is necessary to examine the hole surface carefully under a powerful magnifying glass or microscope.

When the punch 135 attains the FIG. 16 position, it does not stop, as it did in the method species previously described, but continues its downward movement to the position shown in FIG. 17. During such movement, which is the third step in the hole forming operation, the tapered shoulder 137 on the punch engages the workpiece 30B at the outer end of the cross hole 133, and by the application of continued pressure from the pneumatic piston 76 forcibly expands the outer end of hole 133 to form the countersink 38 (FIG. 18).

During the drilling, punching and punch countersinking steps in the operation of forming the cross hole 133, the workpiece 30B was supported by the rear end of the hex key 99 which projected a short distance into the socket 33 as shown in FIG. 16. After the punch 135 has completed the third step and is removed, the hex key is actuated to operate as a burnishing implement. This is the fourth and final step in the operation, and as stated previously, is not always necessary but merely acts as a finishing or sizing operation. In the fourth step, the pneumatic ram 111 is operated to force the hex key 99 deeper into the socket 33. The hex key 99 has the same cross sectional shape as the socket shown in FIG. 18 and has a flat face at its extremity. When actuated by the ram, the flat end 139 of the hex key moves from the normal position, shown in full lines in FIG. 16, to the operated position which is shown in dot dash lines in FIG. 16 and in full lines in FIG. 18. During such movement, the front end of the hex key acts as a burnishing tool in reforming the bulging ring 55 at the inner end of the cross hole from the irregular shape shown in FIGS. 16 and 17, to the sharp edge 39 shown in FIGS. 1 and 18.

As stated previously, the reformation of the bulging edge 55 is performed by one or more strokes of the hex key 99 which functions as a burnishing tool to iron out the metal and bend it back to its original shape, rather than by removal of metal. If, however, any of the metal in the annular rim 55 is removed during the burnishing operation, no harm will be done inasmuch as there is no danger that any metal remaining after the workpiece has been removed from the hole forming apparatus will ever break loose and cause damage. It will be understood that the use of the hex key as a burnishing implement is made possible by the fact that the punch 135 leaves only a very slight deformation of metal at the annular rim 55. By contrast, in the case of a burr produced by drilling through the face 35 in the prior art method, the hex key would not remove the burr but would merely reposition it by moving part of the burr out of the socket and into the cross hole, and another part to the bottom of the socket, where the parts of the burr would present the same hazard as in their original condition.

In the foregoing description, reference was made to a single drill 131 and a single punch 135 each supported in a guide bushing 53 above the workpiece 30B and each arranged to drill or enlarge the cross hole upon downward movement. It should be understood, however, that the terms "upper" and "lower" as well as the terms "front" and "rear" are merely relative and are employed for convenience of description without limiting the scope of the invention either as embodied in FIGS. 13 to 18 or as in any alternative species. The methods described herein are not dependent on gravity and it is immaterial therefore whether the drill (or punch) approaches the workpiece from above or below, or from any angle in between. It will be also understood that the workpiece may be supported in any position, although for convenience, it is consistently illustrated as being disposed on a horizontal axis, with its socket end (sometimes referred to as the rear end) on the left side of the figure.

In practicing the present invention, it is possible to form more than one cross hole at the same time. This simultaneous action is illustrated in FIGS. 13 and 14 which shows a second drill 131 at the bottom; in FIGS. 15, 16 and 17 which show a second punch 135; and in FIG. 18 which shows a second cross hole 133. In order to form two cross holes at the same time, it is necessary to provide a second hole forming assembly including a drill, a punch and means for driving and guiding the same. However, the hex key 99 and the apparatus for supporting and driving the key need not be duplicated as the front end of the key is adapted to pass simultaneously over the rims 39B of both holes to perform the finishing or burnishing operation. Also the carriage assembly 87 need not be duplicated.

In a commercial embodiment of the present invention, it is possible to drill as many as six cross holes simultaneously, this step being followed by the step of simultaneously punching six cross holes. In the use of such apparatus, there are six countersinking operations performed simultaneously, either during the latter part of the drilling step or immediately following the punching operation. Obviously, there is a considerable saving in time and labor cost by forming a plurality of holes simultaneously rather than by making one at a time. However, the use of multiple drills, multiple punches and guiding means therefor creates a problem of design because of space limitations.

FIG. 19 shows a modified apparatus (forming part of species V) which enables the workpiece 30C to be operated upon by six drills (or six punches or any combination thereof) at the same time. In this modification, the bushing 53 is replaced by a collet 140 which snugly embraces the cylindrical periphery 141 of the head of the workpiece 30C and which has six apertures 142, each of which is shaped and designed to perform the function of the bore 52 (FIG. 6) in the bushing, and each of which apertures has a countersink 143 arranged to centralize and guide the drill 41 and/or punch 47 as it penetrates into the collet. As shown in FIG. 19, the axes of the six apertures 142 are disposed in the same vertical plane and extend radially toward the horizontal axis of the workpiece and are uniformly spaced 60° apart. Other details of construction of the collet are shown in FIG. 21 and will be described later, it being sufficient for present purposes to consider the cross sectional shape of the collet as in FIG. 19. This figure shows the six apertures 142 guiding a drill or a punch in six different stages of operation. The first stage is shown at the twelve o'clock position where the drill 41 first makes contact with the workpiece periphery 141. The drill may be supported, as in FIGS. 7 and 8, for downward movement through a stroke of adjustable predetermined length. For convenience of illustration, however, the depth stop adjustment is shown schematically and includes a collar 145 on the drill spindle 146 engageable with the flange 147 on the threaded sleeve 148.

Figure 3:
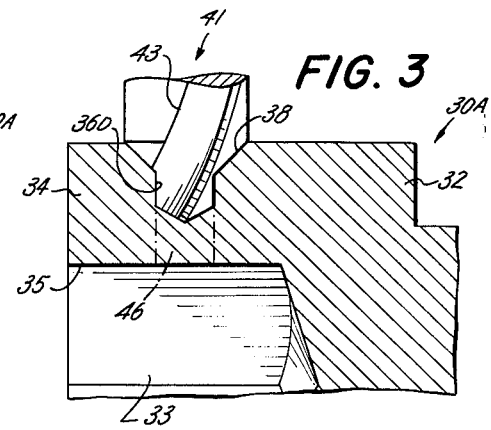
FIG. 3 is a fragmentary longitudinal section at the cap screw blank at the end of the second stage during which the cross hole has been extended by a simultaneous drilling and countersinking operation, the incomplete cross hole being separated from the socket by a solid web.

The aperture 142 in the two o'clock position of FIG. 19 is shown as guiding a drill 41 in a later stage of operation, corresponding to the one illustrated in FIG. 3, at the instant that the depth stop 145, 147 has become effective, and immediately after the drill hole 36D and countersink 38 have been completed. The collet aperture in the four o'clock position is shown with the drill 41 removed and replaced by the punch 47, the latter resting at the inner end of the drill hole 36D and just commencing the punching operation. The aperture 142 in the six o'clock position is shown as guiding the punch 47 with the latter advanced to dislodge the web 46 into the socket 33 in the form of a slug 54, this stage of operation being the same as the one illustrated in FIG. 4. The collet aperture 142 in the eight o'clock position is shown with the punch removed and with the adjacent cross hole 36 completed but unfinished, the cross hole having an annular surface deformation 55 at its inner end. The aperture 142 in the ten o'clock position is shown adjacent the cross hole 36 that is being finished by the action of the hex key 99 in burnishing the annular bulge 55 to reform it to a circular edge 39 at the inner end of the cross hole, this stage corresponding to the one shown in FIG. 18.

It will be understood that while FIG. 19 shows each of the apertures 142 associated with a different stage of operation, it is more desirable to use the same apparatus with six drills and six punches each following the same cycle of operation, and with all six apertures being associated with the same stage at any given time. The cycle of operation shown is that of method species I which includes the steps of drilling, simultaneous drilling and countersinking, and punching.

FIG. 20 shows the collet 140 (apparatus species V) being used in cooperation with a drill 151 and a punch 152 to form a cross hole in the workpiece 30D, according to method species III. As in the case of FIG. 19, the six different stages of operation are shown in a single view extending around the clock, this arrangement being shown in order to avoid duplication of drawings and to conserve space. The drill 151 has an upper portion which is the same in diameter as the upper portions of the other drills and punches. It has a lower portion 153, a shoulder 154 and a helical cutting flute 155, the construction and functions of which are comparable to those of the corresponding parts of the punch 41 shown in FIG. 2. However, the axial length of the lower portion 153 in FIG. 20 is somewhat greater than that of the portion 42 in FIG. 2 with the result that the countersink is only partly formed at the outer end of the cross hole at the instant when drilling is terminated. The collet aperture 142 in the twelve o'clock position of FIG. 20 is shown as guiding the drill 151 with the latter in position to start the drilling operation. The aperture in the two o'clock position of the same figure is shown as guiding the drill 151 at the termination of the drilling operation, at which stage thte tapered shoulder 154 has formed a partial countersink 156 at the outer end of the drill hole 157D. The collet aperture 142 in the four o'clock position is shown as guiding the punch 152 which has been inserted into the drill hole 157D and is about to start the punching operation. The punch has a wide diameter portion 158, an extension 159 and a tapered shoulder 161. The collet aperture 142 in the six o'clock position is shown as guiding the punch 152 with the latter advanced to dislodge the web 46 into the socket 33 in the form of a slug 54. Further movement of the punch causes the tapered shoulder 161 to engage the partial countersink 156 and deform it to the shape of a complete countersink. The collet aperture 142 in the eight o'clock position is shown as guiding the punch 152 at the instant that the final countersink 162 is completed and the movement of the punch is terminated. The collet aperture 142 in the ten o'clock position is shown with the punch removed and with the adjacent cross hole 36 being burnished by the hex key 99 to reform the ridge 55 to an edge 39.

Referring to FIG. 21, the steel collet 140 is constucted in one piece and is hollow from end to end. It comprises for the major portion of its length a cylindrical portion 165, the rear end of which is provided with external screw threads 166 by means of which the collet may be supported in a stationary position. The annular wall of the collet is relatively thin along the cylindrical portion 165 but is enlarged to form a head 167 at the front end of the collet. At its periphery, the head has a forwardly diverging frusto-chemical surface 168, a converging surface 169 and a cylindrical surface 171. Internally, the head has a surface 172 tapering forwardly toward a bore 173 leading to a counterbore 174, the bore and counterbore being separated by a shoulder 175 in a plane transverse to the collet axis 176. In order to impart resilience to the collet, the latter is provided with radial kerfs 177 each extending from the front extremity of the collet, through the head 167 and throughout most of the length of the cylindrical portion 165. As shown in FIGS. 19 and 20, there are three kerfs circumferentially spaced 120° apart, which divide the collet 140 into three sectors or jaws 178. Extending outwardly from the counterbore 174 to the peripheral surface 171 are the six radial apertures 142. As seen in FIGS. 19 and 20, and as previously described, the axes of all the apertures are all located in a common plane perpendicular to the collet axis 176 and are uniformly spaced 60° apart. Each jaw 178 has two apertures, each located 30° from the center line of the adjacent kerf 177.

Referring to FIGS. 21 and 23, one of the functions of the collet 140 is to support the head of the workpiece 30C with the rear extremity of the workpiece head seated against the counterbore shoulder 175 and with the cylindrical periphery 141 of the workpiece head snugly embraced by the cylindrical counterbore 174 in the sectors 178 whereby the axis of the workpiece 30C is aligned with the axis 176 of the collet. In order to close the collet on the workpiece, the threaded portion 166 is held against axial movement while the forwardly diverging peripheral surface 168 is cammed inwardly by the action of a cam sleeve 181 which has a complementary internal taper and which is subjected to a forward thrust. In the closed position of the collet as shown in FIG. 21, the counterbore shoulder 175 lies in a plane perpendicular to the collet axis 176, the radial axes of apertures 142 also lie in a perpendicular plane, and the counterbore sectors 174 are cylindrical. When the cam sleeve 181 is removed, however, the sector jaws 178 expand, causing the counterbore 174 to diverge forwardly and to move the shoulder 175 slightly away from a perpendicular plane. At the same time, the axis of each aperture 142 is swung away from the original perpendicular plane, represented by the work-section line 20—20 in FIG. 21, and is shifted to an oblique position represented by the center line 183. Moreover, the expansion of the collet jaws 178 shifts the axes of the apertures 142 in a circumferential sense so that they are no longer precisely radial or uniformly spaced.

In order to insure that the apertures 142 are properly spaced and extend in a common perpendicular plane when the workpiece 30C is gripped therein (notwithstanding the shifting of the aperture axes that occurs during the gripping movement of the collet, the invention contemplates a novel method of manufacturing the collet. After the collet periphery and the rear part of the collet bore are fabricated in the conventional manner, the collet 140 is then rotated on its axis 176 and a form tool (not shown) is inserted in the front end to cut the counterbore 174 with a cylindrical surface extending to the shoulder 175 in a perpendicular plane. The collet is then supported in a drill press similar to the one shown in FIG. 7 and one of the apertures 142 is drilled along a radial line perpendicular to the collet axis 176. The outer end of the radial aperture 142 is then provided with a countersink 143 and the collet is indexed 60° to repeat the drilling and countersinking operations. After the six apertures 142 are drilled, the collet is heat treated. The three kerfs 177 are then cut by a saw (not shown), the center of each kerf being disposed in a radial plane equidistant between two adjacent apertures 142. As a result of the sawing operation, the collet sectors or jaws 178 lying between kerfs expand thus shifting the axes of the apertures 142 as previously described. However, upon being closed by the cam sleeve 181, or a similar jaw operating device, the apertures return to their original, uniformly spaced, perpendicular positions.

In use, the collet 140 forms part of a chuck assembly 186 shown schematically in FIGS. 22 and 23. The assembly includes a chuck body 187 having at its rear end an annular flange 188 secured by cap screws 189 to any suitable fixture such as a vertical wall 190. The body has a large counterbore 191 which encircles and centers a back head 192 provided with a threaded opening 193 engageable with the threaded end 166 of the collet 140 to provide a rigid support for the collet. The front end of the collet is provided with means for supporting it relative to the chuck body on an axis perpendicular to the vertical wall 190. The supporting and centralizing means, as shown, comprises a sleeve 194 slidably fitting the cylindrical portion 165 of the collet and also slidably fitting a small bore 195 in the front wall of the chuck body 187. The sleeve 194 is connected to a piston head 196, the periphery of which has a sliding fit with an intermediate bore 197. A hose line 199 admits pressure fluid, such as live air, to the expansible chamber 201 in front of the piston head 196. Another expansible chamber 202 is provided between the piston head 196 and a plate 203 in which the reciprocating sleeve 194 has a sliding fit. The plate 203 is seated against the shoulder at the front end of the large counterbore 191 and is maintained in seated condition by a spacer cylinder 204 interposed between the plate and the backhead 192. A rear hose line 205 supplies live air to the rear expansible chamber 202. Suitable valve means (not shown) under semi-automatic control alternately supply live air to one hose line while exhausting the other thereby effecting reciprocation of the sleeve 194. In front of its cylindrical bore, the sleeve 194 has a forwardly diverging frusto-conical surface 206 engageable with the tapered surface 168 of the collet 140. When live air is admitted to the front hose line 199 and vented from the rear hose line 205, as shown in FIG. 22, the reciprocating sleeve 194 is shifted rearward to disengage the tapered surface 168 on the collet and permit the front end thereof to expand radially in response to the inherent resilience or springiness of the collet jaws 178.

In the wide open position of the collet, which is the normal unstressed condition, the counterbore 174 is enlarged to a size which will permit the head of the workpiece 30C to be inserted freely. On the other hand, when live air is admitted to the rear hose line 205 and vented from the front hose line 199, the reciprocating sleeve 194 is shifted forward to cause the frusto-conical surface 206 to exert a camming force on the collet jaws whereby the collet counterbore 174 firmly grips the cylindrical periphery 141 of the workpiece.

When the workpiece or socket head cap screw 30C is first inserted in the counterbore 174, it is indexed to move the flat faces of the socket to a position at right angles with the associated collet apertures 142. In order to facilitate such indexing motion and also for other purposes, the chuck assembly 186 is provided with a hex key 207 mounted at the center of the collet 140 for axial reciprocation. The hex key has a cylindrical body 208 slidably fitting the collet bore 173. In front of the cylindrical body is a hexagonal portion 209. The latter fits the six walls of the workpiece socket 33 and, for the major portion of its length, has the cross sectional shape of a regular hexagon with sharp corners, as indicated in FIG. 19. Near the front end of the hexagonal portion 209, the corners are provided with a chamfer 211 (FIG. 23) which facilitates centering of the socket 33 on the hex key 207.

Extending rearwardly from the cylindrical body 208, the hex key 207 has a shank 212 received within a key holder 213 which is connected to a rod 214 which extends rearward through the back head 192 and vertical wall 190. At its rear end, rod 214 is connected to a piston 215 mounted in a cylinder 216 supported by a bracket 217 attached to the rear face of the vertical wall 190. The cylinder 216 is provided with hose lines 218 and 219 for alternately supplying live air to one end of the cylinder while venting the other thereby to reciprocate the piston 215 and with it the hex key 207. The rearward position of the hex key is controlled by a screw 221 threaded into the rear wall of the cylinder 216 and providing an adjustable limit stop engageable with the rear extremity of the piston 215.

Each of the collet apertures 142 register with a drill 41 and/or with a punch 47, the axes of which are disposed in a common vertical plane 222 perpendicular to the collet axis 174 and therefore parallel to the vertical wall 190. In a commercial embodiment of this invention, there are six drills movable radially in unison during the early stages of operation, and six punches movable radially in unison during the later stages of operation, the latter being arranged to be swung (by shifting means not shown) out of the respective paths of the drills during the early stages. The number of drills and punches in actual use depends upon the requirements of the purchaser and may be reduced to four or two of each, if the purchase order calls for two pairs or one pair of cross holes.

At the start of a cycle of operation, the cam sleeve 194 is in the rearward position (FIG. 22) and the piston 215 is in its forward position due to the action of the control valves (not shown) in supplying live air to the hose lines 199 and 219 while exhausting the hose lines 205 and 218 as indicated by the air flow arrows in FIG. 22. The workman, who faces the front end of the collet 140, observes that the sector jaws 178 are spread to receive a workpiece, also that the hex key 207 is in its forward position. He grasps the workpiece or cap screw blank 30C by the shank portion 31, holds it axially alined with the collet 140 as shown in FIG. 22 and moves the workpiece rearward until the chamfered corners 211 on the hex key 207 enter the rear end of the pre-formed hexagonal socket 33. Thereupon, he manually indexes the workpiece until the socket 33 registers with the hexagonal portion 209 of the hex key and, noticing that it is released for further axial movement, pushes the workpiece until the rear extremity seats against the counterbore shoulder 175 (FIG. 21). Such axial movement is opposed by the sliding friction between the head of the cap screw and the counterbore 174 in the collet jaws 178. The frictional force is slight, being sufficient to prevent accidental movement of the workpiece but not interfering with the manually induced motion.

Having inserted the workpiece 30C with his right hand, the workman presses a switch (not shown) with his left hand which operates a solenoid valve (not shown) to reverse the air supply in hose lines 199 and 205 and thereby cause the cam sleeve 194 to move from the FIG. 22 position to the FIG. 23 position and grip the jaws 178 tight on the head of the workpiece. At the same time, the air supply to the rear cylinder 216 is reversed, causing the hex key 207 to move from the FIG. 22 position to the FIG. 23 position. At this time, the drills 41 are held radially spaced from the workpiece and remain in the unoperated position until the operator moves his right hand to a second switch, both switches being remotely located from the path of the drills and punches for safety reasons.

Actuation of the second switch (not shown) causes the drills 41 to rotate and move toward the collet, with the front end of the drill being guided, first by the countersink 143 and then by the radial aperture 142 until the drill makes contact with the workpiece 30C as illustrated in the twelve o'clock position of FIG. 19. Thereafter each of the drills 41 forms an incomplete cross hole 36D as previously described. The forward motion of the drill is arrested when the collar 145 (FIG. 19) strikes the limiting flange 147, with the drill 41 in the two o'clock position of FIG. 19. The drills are then moved radially outward of the collet apertures 142 and are replaced by the punches 47 which operate in the manner described previously to complete the cross hole 36 as shown in the six o'clock position of FIG. 19. The punches 47 are then withdrawn radially, leaving a cross hole 36 as shown in the eight o'clock position of FIG. 19 which is complete except for a small surface deformation 55.

The inward and outward movements of the drills 41 and punches 47 may be controlled manually, automatically or in predetermined semi-automatic sequence, for example by a system of switches (not shown) each closed at the proper stage in the cycle by a cam on a rotating shaft, and each controlling a solenoid valve.

After the cross hole 36 has been substantially completed, the air supply to the rear cylinder 216 is reversed and the hex key 207 is advanced to the position shown in FIG. 22. During such movement, the hex key slides over the surface deformation 55 to replace it with the smooth edge 39 shown in the ten o'clock position of FIG. 19.

After the cross holes 36 (two, four or six in number) have been completed and burnished, the air supply through the hose lines 199 and 205 is reversed, causing the cam sleeve 194 to move to the FIG. 22 position, thus releasing the grip of the jaws 178 on the head of the workpiece 30C. The latter may then be removed from the collet 140. To facilitate such removal the workman presses a foot switch (not shown) which controls the hose lines 218 and 219 and shifts the piston 215 to pull the hex key 207 part of the way out of the workpiece socket 33, that is, back to the position of FIG. 23. The foot switch is then pressed to shift the hex key 207 again to the FIG. 22 position where it is located for the reception and guidance of a new workpiece.

Preferably, the small bore 173 (FIG. 21) in the collet 140 has a diameter substantially equal to that of the cylindrical body 208 of the hex key 207 whereby the key, at least in the FIG. 22 position, is supported coaxially with the collet bore 174 and therefore in proper position to fit the socket 33 of the workpiece 30C. In the rearward position of the hex key (FIG. 23) the cylindrical portion 208 lies just to the rear of the collet bore 173 and the front end of the hex key is supported by the socket 33 in the workpiece. Upon subsequent removal of the workpiece and forward movement of the hex key 207, the front end of the cylindrical portion 208 engages the tapered surface 172 of the collet which acts to centralize the hex key and guide it for movement into the small bore 173. If desired, the hexagonal portion 209 could be formed with a distance between its corners equal to the diameter of the collet bore 173 in which case the bore would hold the hex key centralized in all operating positions.

While the invention has been described with particular reference to the production of holes in a cap screw, it is not limited to screws of this type but is applicable to screws having a 12 point periphery and a cylindrical socket for reducing the weight. Moreover, the invention is not limited to threaded fasteners but has a broad general application. For example, the method as described can be used for making holes in pipes, flat walls, plates, boards, cylindrical walls, barrels and other structures made of various kinds of metals, plastic and other materials. In the case of metals, the invention has particular utility where the wall thickness is greater than the diameter of the hole. Furthermore, many changes and substitutions may be made in the tools used for carrying out the method of this invention. For example, the fluted drill 41 may be replaced by a spade drill or by an electrical discharge apparatus for producing a hole.

What is claimed is:

1. Apparatus for the formation of cross holes in socket head cap screws, comprising a two step drill, said drill having a drilling portion of cylindrical shape with a helical cutting edge and having an enlarged countersinking portion above the helical portion and coaxial therewith, the drilling portion having an axial length less than the wall thickness of the socketed head of the cap screw workpiece, a chuck for driving the drill, means for supporting the chuck for reciprocating movement in the direction of the axis of the drill, means for supporting a workpiece, with its axis at right angles to the drill and its socketed head interposed in the path of movement of the drill, drill feeding means for advancing the chuck and drill toward the axis of the workpiece while the chuck is rotating to drill a portion of a cross hole in the head of the workpiece, said feeding means being constructed and arranged to continue advancing the drill to cause the latter to drill and countersink simultaneously, and stop means for arresting forward movement of the chuck and drill after the latter has penetrated only part of the radial distance from the head periphery to the socket, leaving a solid web between the inner end of the drilled hole and the socket, means for reversing the axial movement of the chuck to withdraw the drill from the hole, shifting means operable subsequent to the withdrawal of the drill, to effect relative movement between the workpiece and punch and thereby aline the punch with the drilled hole, means for feeding the punch radially inward until the front end of the punch engages the solid web at the inner end of the drilled hole, and fluid pressure means for forcing the punch through the solid web to complete the hole.

2. Apparatus for the formation of cross holes in socket head cap screws, comprising a fixture, a rotary drill, a chuck for driving the drill, means for supporting the chuck for reciprocating movement relative to the fixture in the direction of the axis of the drill, means for supporting a workpiece relative to the fixture with its axis at right angles to the drill axis and its socketed head interposed in the path of movement of the drill, drill feeding means for advancing the chuck and drill toward the axis of the workpiece while the chuck is rotating to drill a portion of a cross hole in the head of the workpiece, stop means for arresting forward movement of the chuck and drill after the latter has penetrated part of the radial distance from the head periphery to the socket, leaving a solid web between the inner end of the drilled hole and the socket means for reversing the axial movement of the chuck to withdraw the drill from the hole, a guideway supported on the fixture, a punch holder supported for reciprocating movement in the guideway, a punch carried by the punch holder, means for effecting relative movement between the workpiece and the guideway to aline the drilled hole with the punch subsequent to the withdrawal of the drill from the hole, and means for thereafter advancing the punch holder toward the workpiece with sufficient force to cause the punch to penetrate through the web to the socket to complete the cross hole.

3. A machine for forming a cross hole in the socketed head of a cap screw, said machine comprising a fixture, a chuck, a drill support and a punch support, the chuck having a body rigidly attached to the fixture at all times, and having a collet whose rear end is immovably attached to the chuck body, the front end of the collet being split to form resilient jaws and having an opening to receive the workpiece, the chuck having a tapered cam sleeve cooperating with a complementary tapered portion of the collect to clamp the jaws around the workpiece upon relative axial movement of the cam sleeve relative to the chuck body without causing axial movement of the workpiece relative to the chuck body or fixture, one of the jaws having a radial aperture whose inner end overlies a portion of the workpiece and whose outer end is countersunk to serve as a guide for a drill punch, means for effecting relative movement between the drill support and fixture to cause the drill to enter the radial aperture, means for rotating and simultaneously feeding the drill to cause it to drill a hole part of the distance through the workpiece while the drill is centralized in the aperture, means for arresting and reversing the feed of the drill before it has penetrated into the workpiece socket, means for effecting relative movement between the punch support and fixture to cause the punch to enter the radial aperture and to be guided thereby into the partly drilled hole, and fluid pressure means for forcing the punch through the remainder of the radial distance into the socket to eject a slug into the socket and thereby complete the cross hole.

4. A machine for forming a cross hole in the socketed head of a cap screw according to claim 3, which includes a burnishing implement supported in the collet for reciprocating movement along the axis of the collet, means for holding the burnishing implement in its rearward position outside the major portion of the socket of the workpiece during the punching operation, and means for moving the burnishing implement forwardly in the socket following withdrawal of the punch from the socket, the front end of the burnishing implement passing over and beyond the inner end of the cross hole to smooth out any surface deformation.

5. The method of making a hole substantially without burrs through a wall wherein the wall area through which the hole is to be formed is not backed by a supporting die, the method comprising: drilling a portion of the hole into the wall to an axial depth less than the thickness of the wall but so as to leave at the bottom of the hole a solid web having an axial thickness no greater than the diameter of the hole; removing the drill; and then moving under pressure through the drilled portion of the hole against the web so as to dislodge the web in one piece from the bottom of the hole a punch having a close fit with the hole and having a flat shearing end surface engagable with the web.

6. The method of forming a hole without burrs in a wall that is accessible for drilling from one side only, which method comprises: drilling a portion of the hole starting at the accessible side and continuing for an axial depth less than the thickness of the wall so as to leave between the bottom of the drilled portion and the accessible side a web having an axial thickness no greater than the diameter of the hole, and then punching through the remainder of the wall to the inaccessible side to eject the web as a slug and thus complete the hole.

7. The method of forming a hole, while inhibiting the formation of burrs, in a metal wall that is accessible for drilling from one side only, which method comprises: drilling a portion of the hole starting on the accessible side and continuing part way through the wall so as to leave a web having an axial thickness no greater than the diameter of the hole, removing the drill from the drilled portion, inserting a punch into the drilled portion, forcing the punch through the remainder of the wall to complete the hole, and burnishing the surface of the wall on the inaccessible side immediately surrounding the punched end of the hole.

8. The method of forming a radial orifice, substantially free from burrs, in an annular metal wall, which method comprises: drilling a part of the orifice inward from the wall periphery for a distance so as to leave at the bottom of the orifice a web having an axial thickness no greater than the diameter of the orifice; removing the drill and inserting a punch into the orifice; extending the depth of the orifice by forcing the punch through the remainder of the annular wall; removing the punch; inserting a burnishing tool into the space surrounded by the annular wall; and reciprocating the burnishing tool to iron out the metal extruded by the punch at the inner end of the orifice, the burnishing tool having a cross section complementing that of the inside surface of the annular wall.

9. The method of forming a radial orifice, substantially free from burrs, in an annular wall, which method comprises: drilling the first part of the orifice at a uniform diameter inward from the wall periphery, drilling the second part of the orifice as an inward extension of the first part and at the same diameter while simultaneously countersinking the outer end of the orifice, terminating the drilling operation before the second part of the orifice has penetrated through the annular wall so as to leave a web having an axial thickness no greater than the diameter of the orifice, and punching the third part of the orifice starting from the inner end of the second part and penetrating through the remaining thickness of the wall to complete the orifice.

10. The method of forming a hole, while inhibiting the formation of burrs, in the annular wall of a hollow metal workpiece, which method comprises: supporting the workpiece in the path of movement of a drill whose diameter is less than the thickness of the annular wall; moving the pointed end of the drill into engagement with the peripheral surface of the annular wall; driving the drill with a combined rotary motion and axial forward motion to form a portion of a hole extending part way through the annular wall; positively arresting the forward axial movement of the drill after it has penetrated more than half the thickness of the annular wall, so as to leave a solid web between the inner end of the drilled portion of the hole having an axial thickness no greater than the diameter of the hole; reversing the axial movement of the drill to remove the latter from the hole; inserting a punch into the hole; and applying an axial forward pressure on the punch to cause it to dislodge the web from the wall and eject it in the form of a solid slug.

11. In the manufacture of cross hole socket head cap screws, the method of forming a radial hole in the wall surrounding the socket, which method comprises: drilling a portion of the hole inward from the head periphery and part way through the wall for a distance so as to leave a web at the bottom of the hole having an axial thickness no greater than the diameter of the hole, removing the drill from the drilled portion, inserting a punch into the drilled portion and forcing the punch through the remainder of the wall thickness into the socket.

12. The method of manufacturing cross hole socket head cap screws, which method comprises: selecting a workpiece having a head formed with a socket surrounded by an annular wall, indexing the workpiece relative to a drill, drilling a part of a hole inward from the head periphery for a distance so as to leave a web at the bottom of the hole having an axial thickness no greater than the diameter of the hole; removing the drill and inserting a punch into the hole; extending the depth of the hole by forcing the punch through the remainder of the annular wall and into the socket; and finally inserting a burnishing tool into the socket to remove surface irregularities produced by the punch at the inner end of the hole; the burnishing tool having a cross section complementing that of the socket.

13. The method of manufacturing cross hole socket head cap screws, which method comprises selecting a workpiece having a head formed with a polygonal socket, indexing the workpiece relative to a drill, drilling a radial hole part of the distance from the periphery of the head inwardly toward the socket leaving an unfinished web between the drilled hole and the socket having an axial thickness no greater than the diameter of the hole, punching through the web to complete the hole and simultaneously form a surface irregularity at the socket end of the hole, and moving a burnishing tool in the socket to smooth the wall thereof and remove the surface irregularity, the burnishing tool having a polygonal cross section complementing that of the socket.

14. The method of manufacturing a cross hole socket head cap screw, which method comprises selecting a workpiece having a head formed with a hexagonal socket open at its upper end, indexing the workpiece with relation to a drill so that one of the flat faces of the socket wall lies in a plane at right angles to the drill, moving the drill inward to engage the head periphery, drilling a radial hole part of the distance from the periphery of the head inwardly toward the socket leaving an unfinished web between the drilled hole and the associated face of the socket having an axial thickness no greater than the diameter of the hole, removing the drill from the partially formed hole, re-positioning the workpiece with the partially formed hole in alinement with a punch, moving the punch into the partially formed hole, and punching through the web and the socket face to dislodge the web in the form of a slug falling loosely into the socket.

15. The method of manufacturing a cross hole socket head cap screw according to claim 14, which method includes the additional step of moving a hex key in the socket to burnish or smooth out the flat face of the socket in the area immediately surrounding the hole.

References Cited by the Examiner
UNITED STATES PATENTS

| | | | |
|---|---|---|---|
| 532,472 | 1/95 | Minnich | 77—66 |
| 1,716,331 | 6/29 | Stowell | 29—404 |
| 2,105,618 | 1/38 | Silva | 29—533 |
| 2,170,811 | 8/39 | Cornell | 29—558 |
| 2,361,771 | 10/44 | Huck. | |
| 2,369,856 | 2/45 | Roberts | 151—5 |
| 2,419,862 | 4/47 | Wales | 29—545 |
| 2,561,788 | 7/51 | Denzler | 279—43 |
| 2,733,925 | 2/56 | Denzler | 279—43 |
| 2,745,120 | 5/56 | Vaughn | 10—10 |
| 2,832,390 | 4/58 | Kustusch | 151—5 |
| 2,859,459 | 11/58 | Stoll. | |
| 2,890,734 | 6/59 | Mullin | 151—33 |
| 3,080,587 | 3/63 | Carlson | 10—10 |
| 3,141,358 | 7/64 | Burke et al. | 29—545 |

ANDREW R. JUHASZ, *Primary Examiner.*